April 3, 1956 W. H. JUDSON ET AL 2,740,394
ENGINE AND SUPERCHARGER ASSEMBLY
Filed Aug. 31, 1954

INVENTORS
WILLIAM HADDON JUDSON
CHARLES A. JUDSON
BY
Robert M. Barr

United States Patent Office 2,740,394
Patented Apr. 3, 1956

2,740,394

ENGINE AND SUPERCHARGER ASSEMBLY

William Haddon Judson, Wayne, and Charles A. Judson, Flourtown, Pa.

Application August 31, 1954, Serial No. 453,391

1 Claim. (Cl. 123—196)

The present invention relates to superchargers and more particularly to an engine and supercharger assembly including a novel lubricating system.

In the use of superchargers it has been and still is the general practice to supply them as attachments for gas engines and when assembled the discharge from the charger is connected to and communicates with the intake manifold of the engine. While such manifold assemblies produce improved engine performance as compared to engines without superchargers, the result is not as efficient as would be expected. A major reason for such loss of efficiency is the tortuous path the compressed mixture is obliged to follow before entering the engine thereby losing compression and creating unnecessary back pressure.

Furthermore prior superchargers have been subject to excessive wear due to lack of proper lubrication of the vanes of the rotor. Heretofore it has been proposed to overcome this defect by introducing oil through axial passages in the rotor shaft to discharge radially into the vane slots. Such a system has not solved the problem because the discharged lubricant is not evenly distributed and so results in lagging vane action with consequent variation or loss of compression.

An object of the present invention is to proivde an engine and supercharger assembly wherein the disadvantages of such prior assemblies have been overcome.

Another object is to provide an engine and supercharger assembly wherein the compressed gas mixture can be discharged directly into the cylinder block of the engine.

Another object of the invention is to provide a novel lubricating system for a supercharger.

A further object is to provide a lubricating system for a supercharger wherein the suply of lubricant is automatically proportioned according to variations of vacuum in the supercharger.

A still further object is to provide a lubricating system for a supercharger of the positive displacement rotary vane type wherein the lubricant is evenly fed to all vanes and in measured quantities according to operating conditions.

Figure 2:
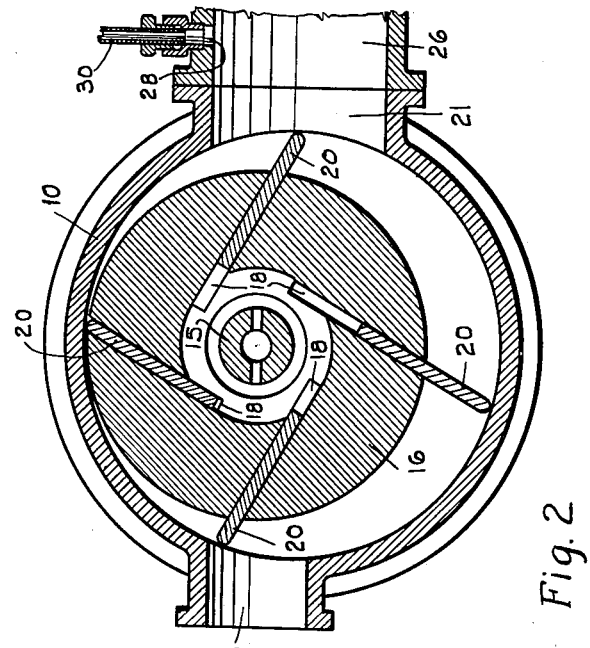
Fig. 2 represents a fragmentary enlarged section on line 2—2 of Fig. 1.
Figure 1:
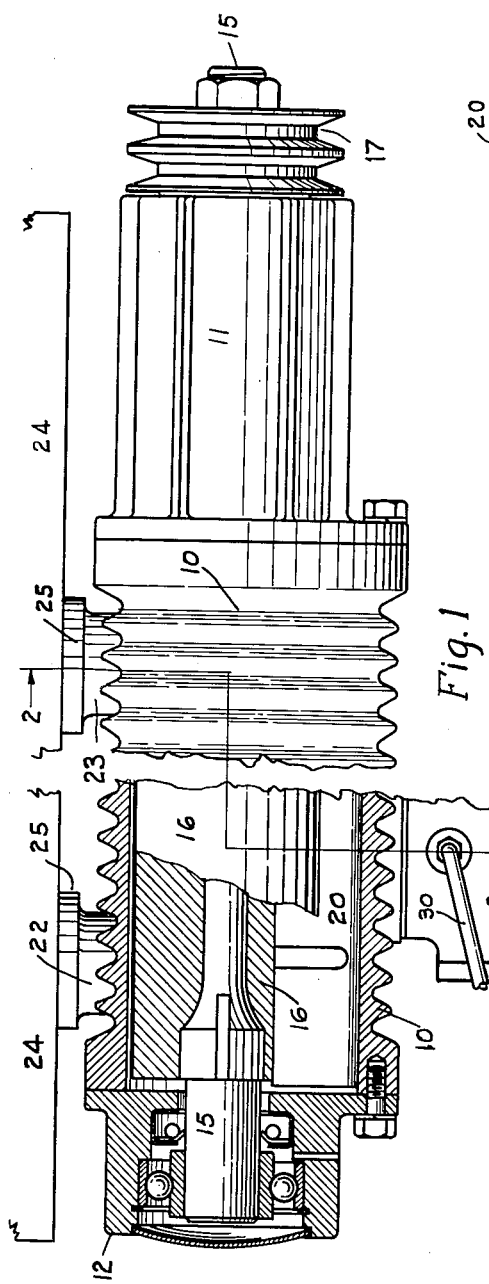
Fig. 1 represents a plan, partly broken away, of an internal combustion engine and supercharger assembly embodying one form of the present invention including the novel oil supplying means.
Figure 3:
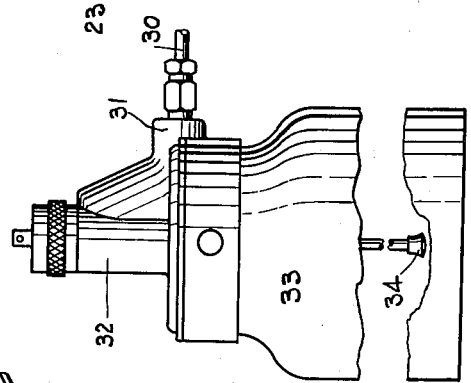
Fig. 3 represents a side elevation of one form of lubricating device.

Referring to the drawings, a supercharger of the positive displacement rotary vane type is shown comprising an internally cylindrical casing 10, closed at opposite ends respectively by heads 11 and 12 having axially disposed hubs for journalling a driven shaft 15 eccentric to the axis of the casing 10. A cylindrical rotor 16 is keyed to the shaft 15 and has a radius such as to make line contact with the inner wall of the casing 10. The shaft 15 is driven, in this instance, by a pulley 17 through a belt or chain from the shaft of the engine of which the supercharger forms an assembled part.

For compressing the mixture entering the casing 10, the rotor 16 is formed with a plurality of longitudinally disposed slots 18, each arranged at an angle substantially parallel to tangents to the shaft 15 and each slot slidingly mounting a vane 20 substantially of the same length as that of the rotor. The depth of the slots 18 relative to the width of the vanes 20 allows each vane to retract into its slot as it rides along the inner wall of the case as projected by centrifugal force and due to the eccentricity of the rotor. The casing 10 is provided with an inlet 21 at one side of the case 10 substantially medially thereof for the gas and air mixture, and with two outlet ports 22 and 23 at the opposite side of the case 10 leading to the intake of the engine block 24. The two port fittings 25 are bolted or otherwise fixed to the block 24, thereby eliminating the usual intake manifold always present in combustion engine assemblies. While direct discharge to the engine is preferred, the supercharger can be connected to discharge into a manifold where the latter is a part of engine with which the supercharger is to be used as an attached part. The inlet 21 communicates with a fitting 26 bolted or otherwise fastened to the casing 10 and having a pipe 27 leading to the discharge of a carburetor (not shown) but of conventional type.

In order to lubricate the rotor 10 and its vanes 20, a novel means has been devised wherein oil is discharged into the mixture as the latter is withdrawn from the carburetor by the produced vacuum in the casing 10. In the preferred form of lubrication an inlet port 28 is provided in the fitting 26 and is connected by a pipe 30 to a source of oil supply. As here shown the pipe 30 communicates with the controlled discharge outlet 31 of an inverse operated pressure regulator valve 32 which is mounted on an oil reservoir 33 to supply measured quantities of oil according to vacuum conditions in the casing 10. The valve 32 is of well known diaphragm opposed spring type having its inlet 34 submerged in the oil in the reservoir 33. Such a control valve is shown in United States Patent No. 2,558,979. By this construction the rotor is supplied with oil proportioned to the speed of rotation. Thus at slow or idling speeds of the engine the vacuum will be a maximum and so hold the needle valve, as set, for minimum delivery of oil. As the speed of the engine is accelerated the vacuum will lower and the needle valve will open to increase the feeding of oil. In this way the oil is fed to the rotor in amounts proportioned according to variations of engine speed.

It will now be apparent that a novel lubricating system for superchargers has been devised as an assembled part of an internal combustion engine and supercharger assembly. By this assembly compressed gas is delivered to the engine with uniform distribution to all cylinders while simultaneously lubricating oil is carried by the mixture to maintain a film of oil on the sliding vanes of the rotor. In oil pumping systems heretofore used for superchargers the vanes are uncertainly supplied so that one or more run dry during the high speed operation and cause damage. Such damage has been overcome by the present novel mixture and oil supply system.

Having now described our invention, we claim:

An engine and supercharger assembly, comprising the combination of an internal combustion engine, a supercharger of the positive rotary vane type having an inlet and an outlet, means for conveying an explosive mixture from a supply source to said inlet, means mounting said supercharger on said engine to discharge compressed mixture through said outlet into said engine, and means to feed lubricant into the mixture in said conveying means, said means being responsive to vacuum conditions in said inlet for proportioning said lubricant feeding means inversely to the vacuum.

References Cited in the file of this patent

UNITED STATES PATENTS

| | | |
|---|---|---|
| 1,883,847 | Van Tuyl | Oct. 18, 1932 |
| 2,241,718 | Meixsell | May 13, 1941 |
| 2,558,979 | Pierce | July 3, 1951 |

FOREIGN PATENTS

| | | |
|---|---|---|
| 611,049 | France | June 26, 1926 |